F. Deming.
Hitching Post.
N° 77,364. Patented Apr. 28, 1868.

Witnesses.
John H. Shumway.
A. J. Tibbits.

Inventor:
F. Deming.
By his Attorney.
John E. Earle

United States Patent Office.

F. DEMING, OF BRIDGEPORT, CONNECTICUT, ASSIGNOR TO JOHN B. ATHERTON AND HENRY A. WHEELER, OF SAME PLACE.

Letters Patent No. 77,364, dated April 28, 1868.

IMPROVED HORSE-HITCHING DEVICE.

The Schedule referred to in these Letters Patent and making part of the same.

TO ALL WHOM IT MAY CONCERN:

Be it known that I, F. DEMING, of Bridgeport, in the county of Fairfield, and State of Connecticut, have invented a new Improvement in Horse Hitch; and I do hereby declare the following, when taken in connection with the accompanying drawings, and the letters of reference marked thereon, to be a full, clear, and exact description of the same, and which said drawings constitute part of this specification, and represent, in—

Figure 1:
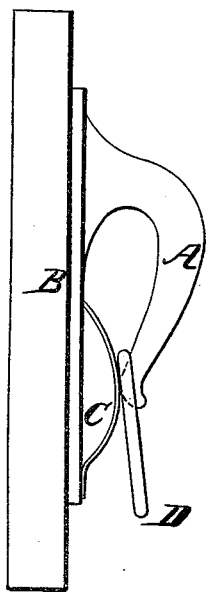

Figure 1, a side view, and in

Figure 2:
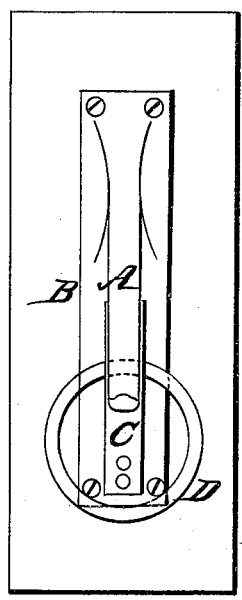

Figure 2 a front view.

This invention is designed to be fixed in stalls, for the purpose of hitching the horse thereto, the object being the construction of a hitch which the horse, if "cast," would naturally detach himself from, and leave his head free, which would avoid the dangers of being cast, and the results therefrom; and the invention consists in an inverted hook, combined with a spring fixed to the body or plate of the hook, so as to bear against the hook, and so that a downward strain upon the ring within the hook would draw the hook therefrom, while an inverted hook would prevent any accidental detachment.

To enable others to construct my improvement, I will proceed to describe the same as illustrated in the accompanying drawings.

A is the hook, formed upon or attached to a plate, B, and on the said plate is fixed a spring, C, below the point of the hook, and curved so as to bear up against the point of the hook; and within the hook A is placed a ring, D', as denoted in blue, to which the halter is attached, the spring being sufficiently strong to retain the ring within the hook, and yet so that a strong downward pressure would draw the ring from the hook.

The hook is attached at any convenient place in the stall, and the horse tied to the ring in the usual manner, but if, in lying down, the halter should be too short, or become entangled in the horse's feet, or otherwise, to render him in danger of casting, the natural strain of the horse upon the ring would draw the ring from the hook, and thus release the horse from his otherwise dangerous position.

Having thus fully described my invention, what I claim as new and useful, and desire to secure by Letters Patent, is—

In combination with the hook A, formed upon the plate B, I claim the spring C, having one end fixed and the other bearing upon the surface of the plate, and curved so that the surface of the spring bears upon the end of the hook, and so as to close the same in the manner described, and with this combined the ring D, as and for the purpose specified.

F. DEMING.

Witnesses:
A. J. TIBBITS,
JOHN H. SHUMWAY.